United States Patent
Hayashi (10) Patent No.: US 10,351,741 B2
(45) Date of Patent: Jul. 16, 2019

(54) CROSSLINKING COMPOSITION HAVING A POLYROTAXANE AND A COMPOUND HAVING TWO OR MORE OXIRANE GROUPS AND/OR OXETANE GROUPS

(71) Applicant: ADVANCED SOFTMATERIALS INC., Kashiwa-shi, Chiba (JP)

(72) Inventor: Yuki Hayashi, Chiba (JP)

(73) Assignee: ADVANCED SOFTMATERIALS INC., Kashiwa-shi, Chiba (JP)

(*) Notice: Subject to any disclaimer, the term of this patent is extended or adjusted under 35 U.S.C. 154(b) by 205 days.

(21) Appl. No.: 14/896,338

(22) PCT Filed: Jun. 6, 2014

(86) PCT No.: PCT/JP2014/065111
§ 371 (c)(1),
(2) Date: Dec. 4, 2015

(87) PCT Pub. No.: WO2014/196636
PCT Pub. Date: Dec. 11, 2014

(65) Prior Publication Data
US 2016/0122605 A1 May 5, 2016

(30) Foreign Application Priority Data
Jun. 7, 2013 (JP) .................... 2013-121283

(51) Int. Cl.
*C09J 167/04* (2006.01)
*C08G 59/50* (2006.01)
(Continued)

(52) U.S. Cl.
CPC ........ *C09J 167/04* (2013.01); *C08G 59/5033* (2013.01); *C09D 167/04* (2013.01)

(58) Field of Classification Search
None
See application file for complete search history.

(56) References Cited

U.S. PATENT DOCUMENTS

2006/0211643 A1 9/2006 Li
2008/0097039 A1 4/2008 Ito
(Continued)

FOREIGN PATENT DOCUMENTS

CN 102105515 A 6/2011
JP 2006-316089 A 11/2006
(Continued)

OTHER PUBLICATIONS

International Search Report dated Aug. 26, 2014, issued in corresponding International Application No. PCT/JP2014/065111, filed Jun. 6, 2014, 5 pages.
(Continued)

*Primary Examiner* — Randy P Gulakowski
*Assistant Examiner* — Ha S Nguyen
(74) *Attorney, Agent, or Firm* — Christensen O'Connor Johnson Kindness PLLC (57) ABSTRACT

The present invention provides a material of high toughness that could not have been provided by an epoxy resin alone. The present invention provides a crosslinking composition having (A) one or more polyrotaxanes in which end-capping groups which prevent dissociation of the linear group are situated at both ends of a pseudo-polyrotaxane formed by inclusion of a linear molecule in the opening of a cyclic molecule by being threaded therethrough, the polyrotaxane having on the cyclic molecule a functional group that is capable of reacting with the oxirane group and/or the oxetane group, the functional group being one or more selected from the group consisting of carboxylic acid groups, carboxylate groups, primary amine groups, secondary amino groups, tertiary amino groups, phenol groups, the oxirane group, and the oxetane group, and (B) a compound having two or more oxirane groups and/or oxetane groups; and a crosslinked product employing the composition.

7 Claims, 4 Drawing Sheets

(51) Int. Cl.
*C08L 63/00* (2006.01)
*C09D 167/04* (2006.01)

(56) References Cited

U.S. PATENT DOCUMENTS

| | | | | |
|---|---|---|---|---|
| 2011/0118376 A1* | 5/2011 | Hayashi | ............... | C08G 65/333 |
| | | | | 522/111 |
| 2011/0124823 A1* | 5/2011 | Hayashi | ................. | C08G 18/10 |
| | | | | 525/424 |

FOREIGN PATENT DOCUMENTS

| | | | | | |
|---|---|---|---|---|---|
| JP | 2006316089 A | * | 11/2006 | | |
| JP | 2009-292727 A | | 12/2009 | | |
| JP | 2010-86864 A | | 4/2010 | | |
| JP | 4482633 B2 | | 6/2010 | | |
| JP | 2012-86147 A | | 5/2012 | | |
| WO | 2009/145073 A1 | | 12/2009 | | |
| WO | WO 2009/145073 A1 | * | 12/2009 | ............. | C08B 37/16 |
| WO | WO 2010/024431 A1 | * | 3/2010 | ............. | C08G 83/00 |

OTHER PUBLICATIONS

International Preliminary Examination Report and Written Opinion dated Dec. 8, 2015, issued in corresponding International Application No. PCT/JP2014/065111, filed Jun. 6, 2014, 6 pages.

\* cited by examiner

CROSSLINKING COMPOSITION HAVING A POLYROTAXANE AND A COMPOUND HAVING TWO OR MORE OXIRANE GROUPS AND/OR OXETANE GROUPS

TECHNICAL FIELD

The present invention relates to a composition, in particular a crosslinking composition comprising a polyrotaxane having a functional group capable of reacting with an oxirane group and/or an oxetane group. Further, the present invention relates to a crosslinked body obtained by using the composition, specifically a sealing material, a coating film and the like. More, the present invention relates to a method for producing the crosslinked body.

BACKGROUND ART

A thermosetting resin having an oxirane group or an oxetane group has excellent heat resistance, mechanical strength (rigidity), and/or workability, and thus it is widely used as an electronic and electrical component, a molding material, a laminate, a sealing material, and the like. However, a history of cooling and heating, and the like sometimes causes cracks in the resin. As a countermeasure for the cracks, a method for adding a plasticizer to the material is generally used. However, the method has such problems that, depending on the plasticizer added, heat resistance and/or strength (modulus of elasticity) of the material deteriorate, that the plasticizer added bleeds out from the material, and the like.

On the other hand, a polyrotaxane exhibits characteristics such as viscoelasticity, a lower compression set and the like in a crosslinked body of polyrotaxanes with each other, a crosslinked body between a polyrotaxane and the like and a polymer other than polyrotaxane, due to movement of cyclic molecules, which constitute the polyrotaxane, on a linear molecule. Since the polyrotaxanebecause can provide these characteristics, the polyrotaxane is expected to offer various applications, and research and development thereof is carried out actively.

For example, Patent Document 1 discloses a crosslinked body obtained by crosslinking a polyrotaxane with a polymer other than polyrotaxane. It also discloses crosslinking a polyrotaxane with a polymer via a crosslinking agent.

Further, Patent Document 2 discloses dispersing a polyrotaxane in a thermosetting resin such as an epoxy resin and a polyimide resin, to raise the glass transition temperature of the thermosetting resin, and to relax stress thereof at below the glass transition temperature. However, the Patent Document 2 does not disclose crosslinking the polyrotaxane with the thermosetting resin via a chemical bond.

More, Patent Document 3 discloses a polyrotaxane wherein cyclic molecules of the polyrotaxane are substituted with -M-A, -M-B, and -C (M represents a polymer portion; A represents a functional group such as a hydroxyl group, an amine, and the like; B represents a hydrophilic group such as a carboxyl group and the like; and C represents A or C).

A polyrotaxane can relax internal stress which is generated upon crosslinking in a crosslinked body and the like between the polyrotaxane and a polymer other than a polyrotaxane, and can be expected to improve brittleness caused in the polymer other than polyrotaxane. Therefore, by adding a polyrotaxane into a thermosetting resin having an oxirane group or an oxetane group, followed by crosslinking them, the polyrotaxane can be expected to play a role as a large movable crosslinking agent in a crosslinked network of the thermosetting resin.

PRIOR ART DOCUMENT

Patent Document

Patent Document 1: JP-B No. 4482633.
Patent Document 2: JP-A No. 2006-316089.
Patent Document 3: WO 2009/145073.

DISCLOSURE OF THE INVENTION

Problems to be Solved by the Invention

As described above, the thermosetting resin having an oxirane group or an oxetane group, for example, an epoxy resin and the like, are used in a semiconductor sealing material, but the resin alone shows low toughness and has a problem of occurrence of cracks and the like.

Further, even though use of a plasticizer is proposed in order to solve the problem, there arise adverse effects of using the plasticizer, that is, a problem that heat resistance, water resistance, and/or strength (modulus of elasticity) of a material as a whole deteriorate, and a problem that the plasticizer bleeds out from the material.

Accordingly, an object of the present invention is to solve the above problems.

Specifically, an object of the present invention is to solve problems that a thermosetting resin having an oxirane group or an oxetane group alone, for example, an epoxy resin and the like alone, can only provide a low toughness material and generates cracks, and the like.

Further, an object of the present invention is, other than or in addition to the above object, to provide a material comprising a thermosetting resin, the material having comparatively high toughness, while maintaining mechanical characteristics such as strength (modulus of elasticity), optical characteristics, heat resistance and/or durability, which are possessed by the thermosetting resin.

More specifically, an object of the present invention is to provide a composition, in particular a crosslinking composition comprising a polyrotaxane having a functional group capable of reacting with an oxirane group and/or an oxetane group; and a compound having two or more oxirane and/or oxetane groups.

Further, an object of the present invention is to provide a crosslinked body, specifically a sealing material, a coating film and the like, obtained by using the composition.

More, an object of the present invention is to provide a method for producing the crosslinked body.

Means for Solving Problems

The present inventor has found the following inventions:
<1> A crosslinking composition comprising
A. a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s), wherein the cyclic molecule(s) has (have) a functional group capable of reacting with an oxirane group and/or an oxetane group, the functional group is one or more selected from the group consisting of a carboxylic acid group, a carboxylate group, a primary amine group, a secondary amine group, a phenol group, an oxirane group, and an oxetane group; and B. a compound having two or more oxirane and/or oxetane groups.

<2> In the above item <1>, the functional group may be bound to the cyclic molecule via a spacer.

<3> In the above item <2>, the spacer may comprise a polymeric portion having 1.5 to 10, preferably 2.0 to 6.0, more preferably 2.5 to 5.0 of an average repeating unit.

<4> In anyone of the above items <1> to <3>, the composition may further comprise C. a crosslinking agent or crosslinking initiator, wherein C. the crosslinking agent or crosslinking initiator is:

C1. at least one selected from the group consisting of phenol resins, acid anhydrides, polycarboxylic acid compounds, and primary amine compounds; or C2. at least one selected from the group consisting of imidazoles, secondary amines, and tertiary amines.

<5> A crosslinked body formed of any crosslinking composition of the above items <1> to <4>.

<6> In the above item <5>, the crosslinked body may have toughness with 25 mm or less, preferably 18 mm or less, more preferably 13 mm or less of a minimum mandrel diameter, when cracks are caused by bending the crosslinked body in a method in accordance with JIS K5600-5-1.

<7> A sealing material comprising the crosslinked body described in the above item <5> or <6>.

<8> A sealing material consisting essentially of the crosslinked body described in the above item <5> or <6>.

<9> A sealing material consisting of the crosslinked body described in the above item <5> or <6>.

<10> A coating film comprising the crosslinked body described in the above item <5> or <6>.

<11> A coating film consisting essentially of the crosslinked body described in the above item <5> or <6>.

<12> A coating film consisting of the crosslinked body described in the above item <5> or <6>.

<13> A method for producing a crosslinked body, comprising the steps of:

a) preparing a polyrotaxan A comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s), wherein the cyclic molecule(s) has (have) a functional group capable of reacting with an oxirane group and/or an oxetane group, the functional group is one selected from the group consisting of a carboxylic acid group, a carboxylate group, a primary amine group, secondary amine group, a phenol group, an oxirane group, and an oxetane group;

b) preparing a compound B having two or more oxirane and/or oxetane groups; and c) mixing the polyrotaxan A and the compound B, and heating the mixture, to crosslink the polyrotaxan A and the compound B;

thereby to obtain the crosslinked body.

<14> In the above item <13>, the method may further comprise a step of d) preparing a crosslinking agent or crosslinking initiator C, which is C1. at least one selected from the group consisting of phenol resins, acid anhydrides, polycarboxylic acid compounds, and primary amine compound; or C2. at least one selected from the group consisting of imidazoles, secondary amines, and tertiary amines, wherein the crosslinking agent or crosslinking initiator C may be mixed together with the polyrotaxane A and the compound B in the step c), and the mixture may be heated, to crosslink the polyrotaxane A and the compound B.

<15> In the above item <13> or <14>, the step a) may comprise:

a)-1) a step of preparing a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s);

a)-2) a step of preparing a second compound having a source of the functional group, which is one or more selected from the group consisting of a carboxylic acid group, a carboxylate group, a primary amino group, a secondary amino group, a phenol group, an oxirane group, and an oxetane group; and a)-3) a step of reacting the polyrotaxane and the second compound, to obtain the polyrotaxane A having the functional group on the cyclic molecule.

Effects of the Invention

The present invention can provide a material having high toughness, which cannot be obtained by using a thermosetting resin having oxirane and oxetane groups alone, for example, an epoxy resin and the like alone.

Further, the present invention can provide, other than or in addition to the above effect, a material comprising a thermosetting resin, the material having comparatively high toughness, while maintaining mechanical characteristics such as strength (modulus of elasticity), optical characteristics, heat resistance, and/or durability, which are possessed by the thermosetting resin.

The present invention can provide a composition, in particular a crosslinking composition comprising a polyrotaxane having a functional group capable of reacting with an oxirane group and/or an oxetane group; and a compound having two or more oxirane and/or oxetane groups.

Further, the present invention can provide a crosslinked body, specifically a sealing material, a coating film and the like, obtained by using the composition. The present invention can provide, in particular, a crosslinked body, specifically a sealing material, a coating film and the like, having high toughness.

More, the present invention can provide a method for producing the crosslinked body.

EMBODIMENTS FOR CARRYING OUT THE INVENTION

The invention(s) disclosed herein will be described in detail, hereinafter.

The present application discloses a crosslinking composition, a crosslinked body formed from the composition, and a method for producing the crosslinked body. In the following, these will be described in order.

<Crosslinking Composition>

The present application discloses a crosslinking composition.

The crosslinking composition comprises:
A. a polyrotaxane comprising a pseudopolyrotaxane which comprises a linear molecule included in an opening(s) of a cyclic molecule(s) in a skewered manner, and capping groups which are disposed at both ends of the pseudopolyrotaxane so that the cyclic molecule(s) does not dissociate, wherein the cyclic molecules contain a functional group(s) capable of reacting with an oxirane group and/or an oxetane group; and
B. a compound having two or more oxirane and/or oxetane groups.

<A. Polyrotaxane>

The crosslinking composition according to the present invention comprises a polyrotaxane A.

The polyrotaxane A comprises a cyclic molecule(s) having a functional group (s) capable of with reacting an oxirane group and/or an oxetane group.

The functional group may be one or more selected from the group consisting of a carboxylic acid group, a carboxylate group, a primary amino group, a secondary amino group, a phenol group, an oxirane group, and an oxetane group; preferably one or more selected from the group consisting of a carboxylic acid group, a carboxylate group, a primary amino group, a secondary amino group, and an oxirane group; and more preferably one or more selected from the group consisting of a carboxylic acid group, a carboxylate group, a primary amino group, and a secondary amino group.

More specifically, examples of the functional group may include, but are not limited to, a carboxylic acid group derived from a cyclic acid anhydride such as —CO(CH$_2$)$_2$—COOH derived from succinic acid anhydride, —CO(CH$_2$)$_4$—COOH derived from glutaric acid anhydride, —COCH$_2$CH(Ph)-COOH (Ph represents a substituted benzene ring) derived from phenylsuccinic acid anhydride, —COCH═CH—COOH derived from maleic acid anhydride, —CO—(Ph) (COOH)$_2$ derived from trimellitic acid anhydride, and the like; —CH$_2$COOH derived from chloroacetic acid, —CH(CH$_3$) COOH derived from 2-bromopropionic acid, —(CH$_2$)$_2$COOH derived from 3-bromopropionic acid, —(CH$_2$)$_2$COOH derived from 3-chloropropionic acid, and triethylammonium salts thereof; pyridinium salts; ethylamine derived from ethylenediamine, hexylamine derived from hexamethylenediamine, ethylamine derived from bromoethylamine, and —NH$_2$ derived from an amino acid such as alanine, glycine and the like; a functional group having a 1-propanamine residue, a functional group having a piperidine residue, a functional group having a phenol group or a phenol derivative, a glycidyl ether, an oxetane group derived from 3-methyl-3-oxetanemethanol, a substituent having a cyclohexene oxide residue; and the like.

The functional group may bind to the cyclic molecule via a spacer. The spacer may be disposed, for example, in order to make the functional group easier to bind to the cyclic molecule. Further, the spacer may be disposed, for example, in order to improve solubility of the polyrotaxane A in a solvent and its compatibility with the compound B.

The spacer is not particularly limited as long as it is a binding group which becomes interposed between the functional group and the cyclic molecule.

The examples of the spacer may include, but are not limited to, an ethyleneoxy group, a hexyloxy group, a hexanoic acid ester group, a butylene carbamoyl group, a group having a phenylene derivative, a poly(dimethylsilyl) group, a polyethylene oxide polymer group, a polycaprolactone polymer group and the like.

The spacer may have a polymeric portion having 1.5 to 10.0 or more, preferably 2.0 to 6.0, and more preferably 2.5 to 5.0 of an average repeating unit, depending on the "B. a compound having two or more oxirane and/or oxetane groups" which is used in the composition, that is, the "B. a compound having two or more oxirane and/or oxetane groups" which is used when forming the after-mentioned crosslinked body.

The repeating unit of the polymeric portion may be polycaprolactone.

<<Cyclic Molecule>>

The cyclic molecule is not particularly restricted as long as a linear molecule is included in cavities of the cyclic molecules in a skewered manner.

The cyclic molecule may have the above-described functional group(s), and the functional group(s) may be bound to the cyclic molecule via the spacer. The cyclic molecule, which may be used as a raw material, may have a hydroxyl group (s) in order to bind to the spacer. Further, the cyclic molecule may have a group(s) other than the above-described functional group (s). For example, the examples of the group (s) may include, but are not limited to, an acetyl group, a propionyl group, a butylcarbamoyl group, a hydroxypropyl group, a hydroxybutyl group, a trimethylsilyl group, a phenyl group, a benzylcarbamoyl group and the like.

The cyclic molecule may be, for example, selected from the group consisting of α-cyclodextrin, β-cyclodextrin and γ-cyclodextrin. Apart of —OH groups in α-cyclodextrin and the like may be substituted with the group(s) other than the above-described functional group(s), for example, an acetyl group, a propionyl group, a butylcarbamoyl group, a hydroxypropyl group, a hydroxybutyl group, a trimethylsilyl group, a phenyl group, a benzylcarbamoyl group and the like as described above.

<<Linear Molecule>>

The linear molecule of a polyrotaxane A according to the present invention is not limited as long as the linear molecule may be included in a cavity (cavities) of the cyclic molecule(s) in a skewered manner.

For example, the linear molecule may include polyvinyl alcohol, polyvinylpyrrolidone, poly(meth)acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth)acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. For example, the linear molecule may be selected from the group consisting of polyethylene glycol, polyisoprene, polyisobutylene, polybutadiene, polypropylene glycol, polytetrahydrofuran, polydimethylsiloxane, polyethylene, polypropylene, polyvinyl alcohol and polyvinyl methyl ether. In particular, the linear molecule may be polyethylene glycol.

A weight average molecular weight of the linear molecule may be 1,000 or more, preferably 3,000 to 100,000, more preferably 6,000 to 50,000.

In the polyrotaxane A according to the present application, the combination of (cyclic molecule, linear molecule) may be (one derived from α-cyclodextrin, one derived from polyethylene glycol).

<<Capping Group>>

The capping group of the polyrotaxane A according to the present invention is not limited, as long as the group is located at both ends of a pseudopolyrotaxane, and the group has a function of preventing dissociation of a cyclic molecule(s) from a linear molecule.

For example, the capping group may be selected from the group consisting of dinitrophenyl groups; cyclodextrins; adamantane groups; trityl groups; fluoresceins; silsequioxanes; pyrenes; substituted benzenes (example of the substituent may include, but are not limited to, alkyl, alkyloxy, hydroxy, halogen, cyano, sulfonyl, carboxyl, amino, phenyl and the like. The substituent may be single or plural.); polycyclic aromatics which may be substituted (examples of the substituent may include, but are not limited to, those described above. The substituent may be single or plural.); and steroids. Preferably, the capping group may be selected from the group consisting of dinitrophenyl groups; cyclodextrins; adamantane groups; trityl groups; fluoresceins; silsequioxanes; and pyrenes, more preferably adamantane groups or cyclodextrins.

<B. Compound Having Two or More Oxirane and/or Oxetane Groups>

The crosslinking composition of the present application comprises a compound B.

The compound B has two or more oxirane and/or oxetane groups.

The compound B may be, but is not limited to, bisphenol A diglycidyl ether, tetramethylbisphenol A diglycidyl ether, bisphenol F diglycidyl ether, 3,4-epoxycyclohexylmethyl 3,4-epoxycyclohexanecarboxylate, 1,4-cyclohexanedimethanol diglycidyl ether, neopentyl glycol diglycidyl ether, polypropylene glycol diglycidyl ether, tetrakisphenol ethane epoxy, phenol novolac epoxy, naphthalene novolac epoxy, Aron Oxetane OXT-221 and OXT-121 (produced by Toa Gosei Co., Ltd.), and derivatives thereof.

Among them, the compound B may preferably be bisphenol A diglycidyl ether, or 3,4-epoxycyclohexylmethyl 3,4-epoxycyclohexanecarboxylate, more preferably bisphenol A diglycidyl ether.

One of the two or more oxirane and/or oxetane groups of the compound B can be reacted with a first functional group of a polyrotaxane A-1, to form a bonding, and the other one of the two or more oxirane and/or oxetane groups can be reacted with a second functional group of a polyrotaxane A-2, to form a bonding, thereby, to crosslink the polyrotaxanes A-1 and A-2, resulting in a crosslinked body X-1.

Figure 1:
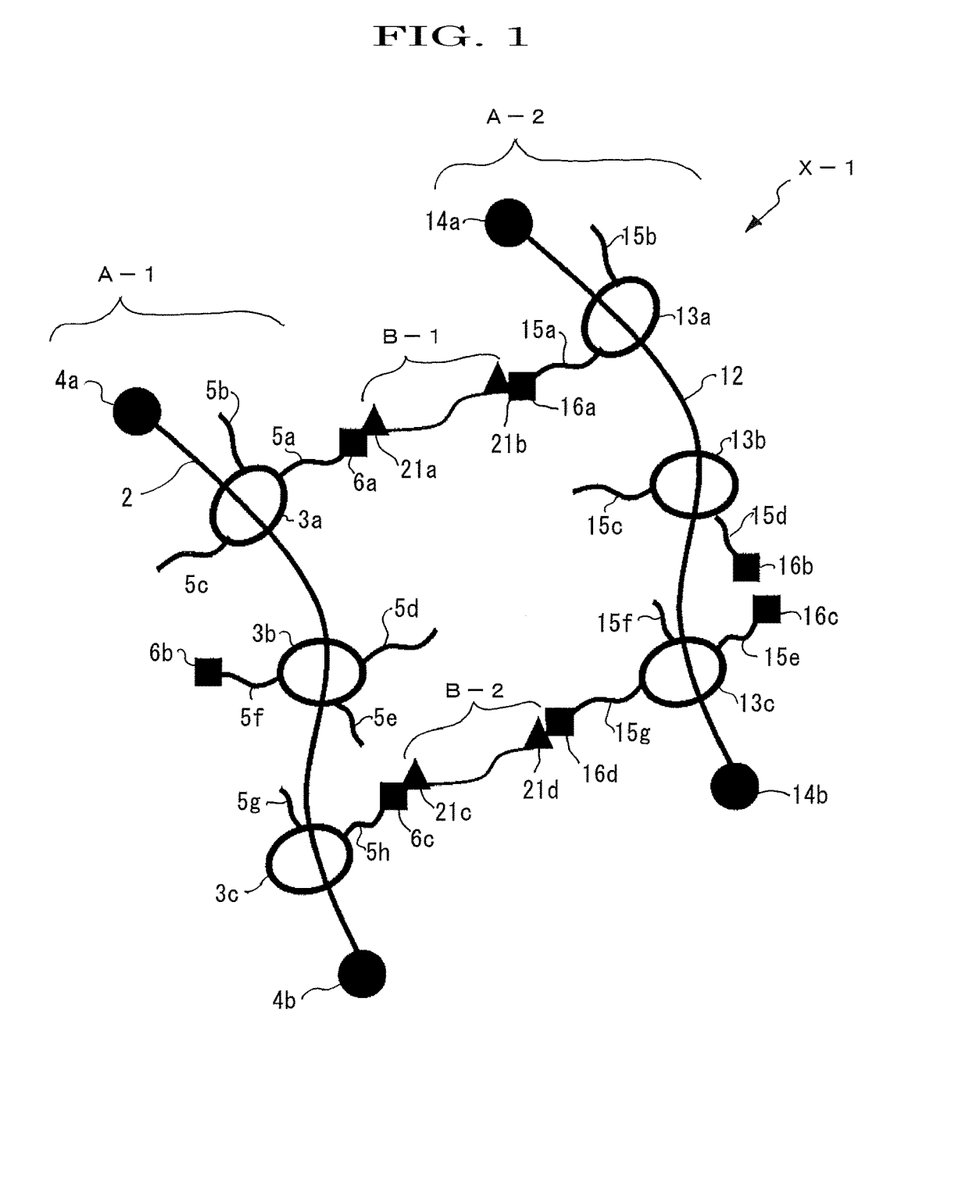
FIG. 1 shows a view illustrating conceptually a crosslinked body X-1 of polyrotaxanes A and compounds B.

FIG. 1 schematically shows the crosslinked body X-1 wherein polyrotaxanes A-1 and A-2 are crosslinked via compounds B.

The crosslinked body X-1 is comprised of the polyrotaxanes A-1 and A-2, and compounds B-1 and B-2. The polyrotaxane A-1 comprises a linear molecule 2 included in cavities of cyclic molecules 3a, 3b, and 3c in a skewered manner, and capping groups 4a and 4b which are located at both ends of the linear molecule 2 in order to prevent the dissociation of the cyclic molecules 3a, 3b, and 3c. The cyclic molecule 3a has a functional group 6a represented by a black square (■) via a spacer 5a. Further, the cyclic molecule 3a has spacers 5b and 5c which are similar to the spacer 5a. The cyclic molecule 3b has a functional group 6b represented by a black square (■) via a spacer 5f, and has spacers 5d and 5e which are similar to the spacer 5f. The cyclic molecule 3c has a functional group 6c represented by a black square (■) via a spacer 5h, and has a spacer 5g which is similar to the spacer 5h.

The polyrotaxane A-2, in a manner similar to the polyrotaxane A-1, is comprised of a linear molecule 12, cyclic molecules 13a, 13b, and 13c, and capping groups 14a and 14b. The cyclic molecule 13a has a functional group 16a represented by a black square (■) via a spacer 15a, and has a spacer 15b which is similar to the spacer 15a. The cyclic molecule 13b has a functional group 16b represented by a black square (■) via a spacer 15d, and has a spacer 15c which is similar to the spacer 15d. The cyclic molecule 13c has a functional group 16c represented by a black square (■) via a spacer 15e, and a functional group 16d represented by a black square (■) via a spacer 15g, and has a spacer 15f which is similar to the spacer 15e and the like.

The compound B-1 has, at its both ends, oxirane and/or oxetane groups (hereinafter, referred to as "oxirane groups and the like" in descriptions of FIGS. 1 to 5) 21a and 21b represented by black triangles (■). The compound B-2, in a manner similar to the compound B-1, also has, at its both ends, oxirane groups and the like 21c and 21d represented by black triangles (■).

The polyrotaxane A-1 is crosslinked with the polyrotaxane A-2 via the compounds B-1 and B-2, to form the crosslinked body X-1. Specifically, the functional group 6a possessed by the cyclic molecule 3a of the polyrotaxane A-1 is reacted with the oxirane group and the like 21a of the compound B-1, to form a bonding. Further, the functional group 16a possessed by the cyclic molecule 13a of the polyrotaxane A-2 is reacted with the oxirane group and the like 21b of the compound B-1, to form a bonding. More, the functional group 6c possessed by the cyclic molecule 3c of the polyrotaxane A-1 is reacted with the oxirane group and the like 21c, to form a bonding. Further, the functional group 16d possessed by the cyclic molecule 13c of the polyrotaxane A-2 is reacted with the oxirane group and the like 21d, to form a bonding, thereby, to form the crosslinked body X-1.

Further, one of two or more oxirane groups and the like of the compound B is reacted with a first functional group of the polyrotaxane A-1, to form a bonding, and the other one of the two or more oxirane groups and the like is reacted with the oxirane group and the like of other compound B, to form a bonding, thereby, to form a crosslinked body X-2, which is formed of a crosslinked body of the compounds B and a crosslinked body of the polyrotaxanes A-1 and A-2.

Figure 2:
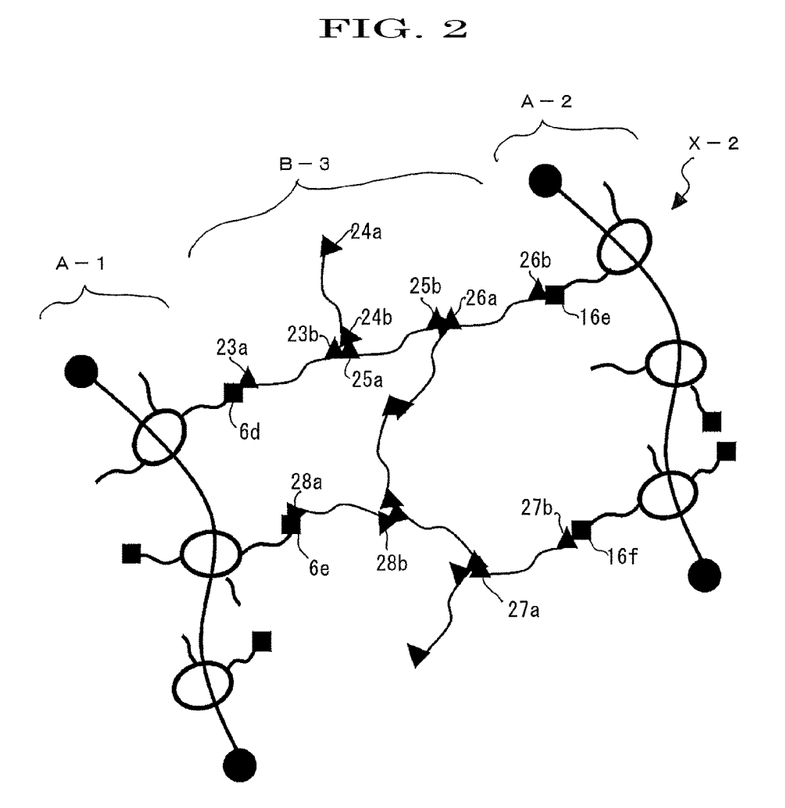
FIG. 2 shows a view illustrating conceptually a crosslinked body X-2 of polyrotaxanes A and compounds B.

FIG. 2 schematically shows the crosslinked body X-2, wherein polyrotaxanes A-1 and A-2 are crosslinked via B-3 which is a crosslinked body of compounds B with each other.

The crosslinked body X-2 is comprised of the polyrotaxanes A-1 and A-2, and the crosslinked body B-3 of the compounds B with each other.

The polyrotaxane A-1 comprises, in a manner similar to the above one, a linear molecule, cyclic molecules, and capping groups, and the cyclic molecules have functional groups 6d and 6e represented by black squares (■) via spacers.

The polyrotaxane A-2 comprises, in a manner similar to the above one and in a manner similar to the polyrotaxane A-1, a linear molecule, cyclic molecules, and capping groups, and the cyclic molecules have functional groups 16e and 16f represented by black squares (■) via spacers.

Each of the compounds B has the oxirane groups and the like represented by black triangles (▲) at its both ends. The oxirane groups and the like, for example, oxirane groups and the like 23b, 24b, and 25a are reacted with each other, to bind to the compounds B each other, resulting in forming crosslinked body B-3 formed of compounds B.

In the crosslinked body B-3 of compounds B, the oxirane group and the like 23a represented by a black triangle (▲) is reacted with the functional group 6d represented by a black square (■), and the oxirane group and the like 28a represented by a black triangle (▲) is reacted with the functional group 6e represented by a black square (■), resulting in binding the polyrotaxane A-1 and the crosslinked body B-3 of compounds B.

Further, in the crosslinked body B-3 of compounds B, the oxirane group and the like 26b represented by a black triangle (▲) is reacted with the functional group 16e represented by a black square (■), and the oxirane group and the like 27b represented by a black triangle (▲) is reacted with the functional group 16f represented by a black square (■), resulting in binding the polyrotaxane A-2 and the crosslinked body B-3 of compounds B.

Thereby, the polyrotaxanes A-1 and A-2 are bound via the crosslinked body B-3 of compounds B, to form the crosslinked body X-2.

More, the oxirane groups and the like of compounds B can be reacted with each other, to form a crosslinked body X-3 of compounds B.

Figure 3:
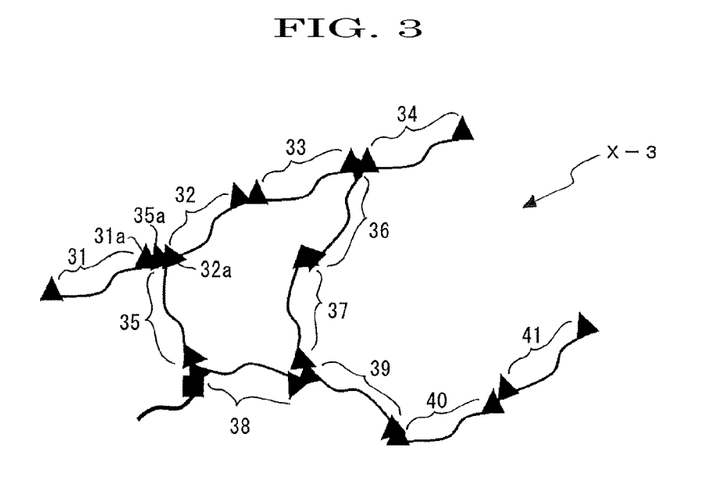
FIG. 3 shows a view illustrating conceptually a crosslinked body X-3 of compounds B.

FIG. 3 schematically shows the crosslinked body X-3 of compounds B.

The crosslinked body X-3 is formed by reactions of the oxirane groups and the like of compounds B, 31 to 41, with each other. The compound 31 and the compound 32 are reacted via the oxirane group and the like 31a represented by a black triangle (▲) of the compound 31 and the oxirane group and the like 32a represented by a black triangle (▲) of the compound 32, and also are reacted with the oxirane group and the like 35a represented by a black triangle (▲) of the compound 35, to form bindings. In a manner similar to the above one, oxirane groups and the like represented by black triangles (▲) derived from other compounds B are reacted with each other, to form bindings, and to form the crosslinked body X-3.

Furthermore, in a case where the compound B-1 has three or more oxirane groups and the like, one of the groups is reacted with a first functional group of the polyrotaxane A-1, to form a binding, other one of the three or more groups is reacted with a second functional group of the polyrotaxane A-2, to form a binding, and other one of the three or more groups is reacted with an oxirane group or the like of other compound B-2, to form a binding. In this case, the compound B-1 enables formation of a crosslinked body X-4 between a crosslinked body formed of compounds B and a crosslinked body formed of polyrotaxanes A.

Figure 4:
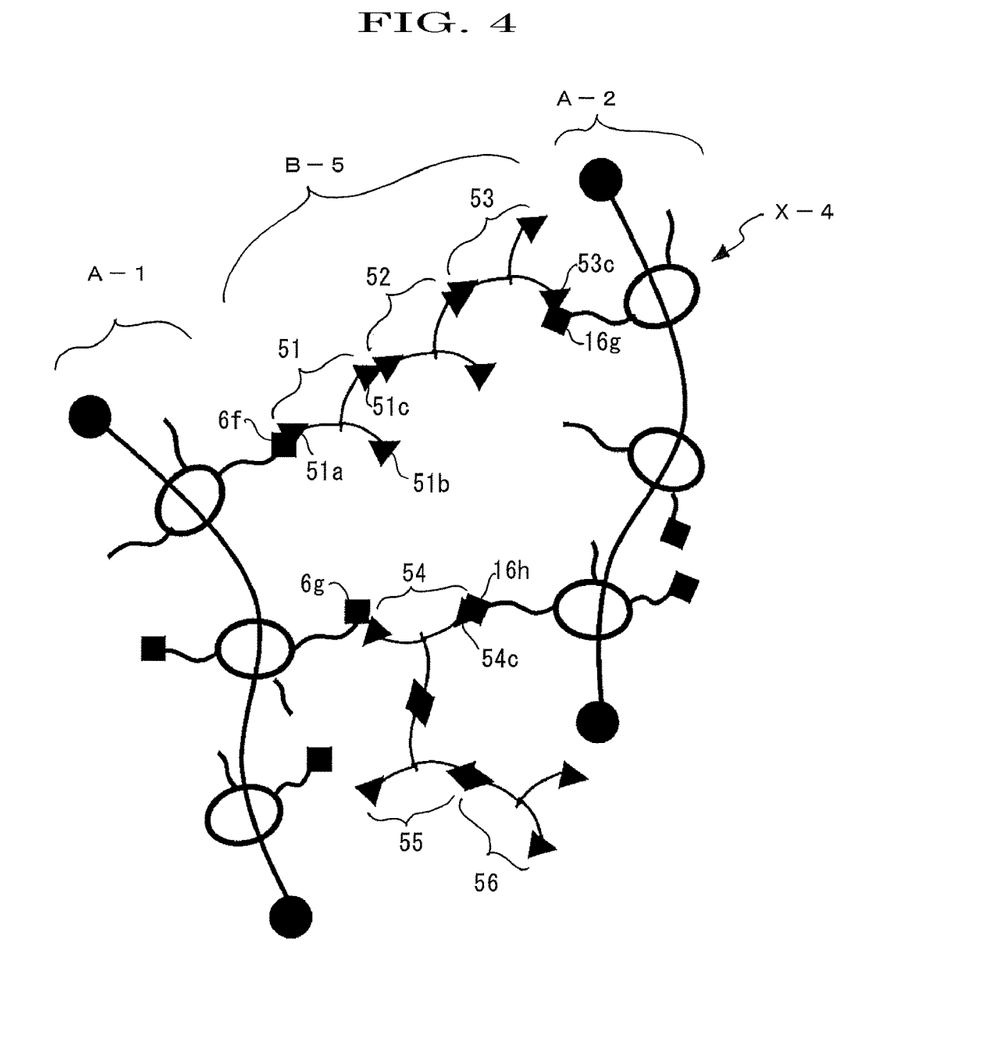
FIG. 4 shows a view illustrating conceptually a crosslinked body X-4 of polyrotaxanes A with compounds B by using compounds B-1, each having three or more oxirane and/or oxetane groups.

FIG. 4 schematically shows the crosslinked body X-4 of the crosslinked body formed of compounds B and the crosslinked body formed of polyrotaxanes A via the compound B-1 having three or more oxirane groups and the like.

The crosslinked body X-4 is comprised of the polyrotaxanes A-1 and A-2, and compounds 51 to 56, each having three oxirane groups and the like represented by black triangles (■).

The polyrotaxane A-1, in a manner similar to the above one, comprises a linear molecule, cyclic molecules and capping groups, and the cyclic molecules have functional groups 6f and 6g represented by black squares (■) via spacers.

The polyrotaxane A-2, in a manner similar to the above one and in a manner similar to the polyrotaxane A-1, comprises a linear molecule, cyclic molecules and capping groups, and the cyclic molecules have functional groups 16g and 16h represented by black squares (■) via spacers.

The compounds 51 to 56 each having three oxirane groups and the like represented by black triangles (▲) respectively have three oxirane groups and the like, a, b, and c. For example, with regard to the compound 51, its oxirane group and the like 51c represented by a black triangle (▲) is reacted with an oxirane group and the like 52a represented by a black triangle (▲) of the neighboring compound 52, to form a binding. The compounds 51 to 56 each has three oxirane groups and the like, a, b, and c, respectively, which are reacted with each other to form bindings, and to form a crosslinked body B-5 formed of these compounds.

Further, with regard to the compound 51, its oxirane group and the like 51a represented by a black triangle (▲) is reacted with a functional group 6f represented by a black square (■) of the polyrotaxane A-1, to form a binding. In a manner similar to the above one, the oxirane group and the like 54a represented by a black triangle (▲) of the compound 54 is reacted with the functional group 6g represented by a black square (■) of the polyrotaxane A-1, to form a binding.

More, with regard to the compound 53, its oxirane group and the like 54c represented by a black triangle (▲) is reacted with the functional group 16g represented by a black square (■) of the polyrotaxane A-2, to form a binding. In a manner similar to the above one, the oxirane group and the like 54c represented by a black triangle (▲) of the compound 54 is reacted with the functional group 16h represented by a black square (■) of the polyrotaxane A-2, to form a binding.

Thereby, the polyrotaxanes A-1 and A-2 are bound to each other via the crosslinked body B-5 formed of compounds B, each having three oxirane groups and the like, to form the crosslinked body X-4.

The crosslinking composition according to the present invention enables coexistence of the crosslinked bodies X-1, X-2, X-3, and X-4.

An amount of the polyrotaxane A and an amount of the compound B are not particularly limited but, depending on characteristics of a crosslinked body obtained from a crosslinking composition, amounts thereof can be specified. For example, when characteristics required of a crosslinked body emphasizes those derived from the compound B, for example, workability, rigidity due to curing, heat resistance, and the like, the amount of polyrotaxane A may be made relatively small compared to the amount of compound B.

For example, a weight ratio, (polyrotaxane A)/(compound B) may be 0.15 or less, preferably 0.10 or less.

<C. Crosslinking Agent or Crosslinking Initiator>

The crosslinking composition according to the present application may comprise a crosslinking agent or crosslinking initiator C.

The crosslinking agent or crosslinking initiator C may be, depending on the form of crosslinking, the following C1 or C2:

C1: at least one selected from the group consisting of phenol resins, acid anhydrides, polycarboxylic acid compounds, and primary amine compounds; preferably at least one selected from the group consisting of acid anhydrides, polycarboxylic acid compounds, and primary amines; and more preferably at least one selected from the group consisting of acid anhydrides and primary amine compounds.

C2: at least one selected from the group consisting of imidazoles, secondary amines, and tertiary amines; preferably at least one selected from the group consisting of imidazoles and tertiary amines; and more preferably at least one selected from the group consisting of tertiary amines.

The phenol resins in C1 may be, but is not limited to, phenol novolacs, naphthalene novolacs, phenol aralkyls, naphthol aralkyls and the like.

The acid anhydrides in C1 may be, but is not limited to, tetrahydrophthalic acid anhydride, methyltetrahydrophthalic acid anhydride, hexahydrophthalic acid anhydride, pyromellitic acid anhydride, trimellitic acid anhydride, benzophenone-tetracarboxylic acid anhydride and the like.

The polycarboxylic acid compounds in C1 may be, but is not limited to, adipic acid, trimellitic acid, glutaric acid, 1,3,5-pentanetricarboxylic acid and the like.

The primary amines in C1 may be, but is not limited to, diethylenetriamine, triethylenetetramine, m-xylenediamine and the like.

The imidazoles in C2 may be, but is not limited to, 2-methylimidazole, 2-ethyl-4-methylimidazole, 1-cyanoethyl-2-methylimidazole, 1-benzyl-2-phenylimidazole and the like.

The secondary amines in C2 may be, but is not limited to, piperidine, N-aminoethylpiperazine and the like.

The tertiary amines in C2 may be, but is not limited to, N,N-dimethylpiperazine, triethylenediamine, benzyldimethylamine, 2,4,6-tris(dimethylaminoethyl)phenol, and diazabicycloundecene.

In a case where the crosslinking composition according to the present application comprises the crosslinking agent or crosslinking initiator C1, the C1 also acts as a crosslinking agent for the compound B, since an active functional group of the C1 is, for example, a hydroxyl group of phenol, a proton of an amine, a carboxylic acid group and the like. In short, the C1 is stoichiometrically reacted with the compound B, specifically with the oxirane and/or oxetane groups of the compound B. The equivalents of the C1 in the crosslinking composition according to the present application may be preferably set at a value so that a total of the equivalents of the functional groups of the polyrotaxane A and the equivalents of the C1 becomes equal to the equivalents of the oxirane and/or the oxetane groups of the compound B. That is, the equivalents of the C1 in the composition may be less than the equivalents of the oxirane and/or the oxetane groups of the compound B, and preferably, equal to or less than a value obtained by subtracting the equivalents of the functional groups of the polyrotaxane A from the equivalents of the oxirane and/or the oxetane groups of the compound B.

Further, in a case where the crosslinking composition according to the present application comprises a crosslinking agent or crosslinking initiator C2, since the C2 acts as a crosslinking initiator for oxirane and/or oxetane groups, the C2 catalytically makes the compounds B crosslink with each other (through an anionic polymerization reaction). Further, in a case where the polyrotaxane A has an oxirane or oxetane group (s) as a functional group (s), the polyrotaxanes A are crosslinked by an anionic polymerization reaction. Therefore, in a case where the polyrotaxane A has an oxirane or oxetane group (s) as a functional group (s), an amount of C2 to be used may be 5 wt % or less, preferably 2 wt % or less, more preferably 1 wt % or less, relative to a total weight of the compound B and the polyrotaxane A.

On the other hand, in a case where the polyrotaxane A has no oxirane or oxetane group as a functional group, the polyrotaxane A is stoichiometrically reacted (crosslinked) with the compound B. In this case, C2 acts as a crosslinking initiator which makes excess compounds B, which are not reacted with the polyrotaxane A, crosslink with each other. Therefore, in a case where the polyrotaxane A has no oxirane or oxetane group as a functional group, the amount of C2 to be used may be 5 wt % or less, preferably 2 wt %, more preferably 1 wt % or less, relative to the compound B.

Figure 5:
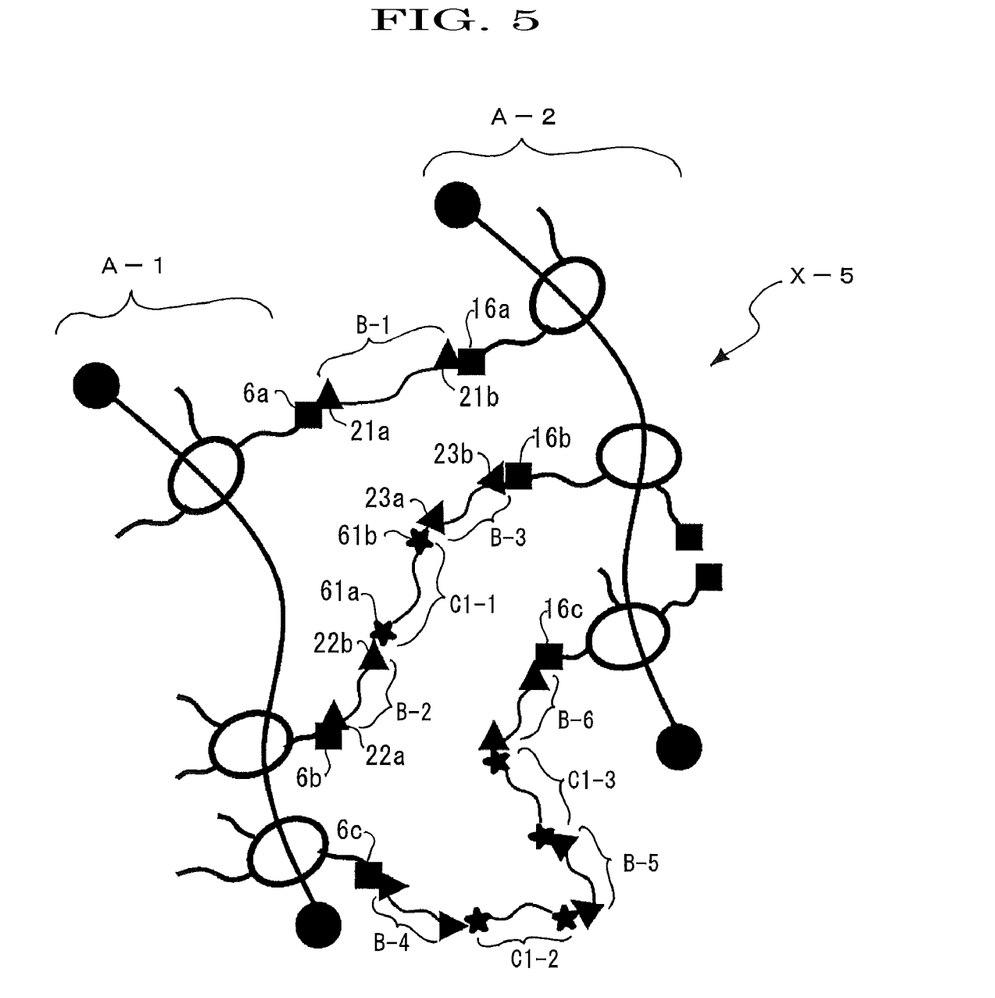
FIG. 5 shows a view illustrating conceptually a crosslinked body X-5 obtained by crosslinking polyrotaxanes A and compounds B in the presence of crosslinking agents C1.

FIG. 5 is a figure which schematically shows a crosslinked body X-5 obtained by crosslinking the polyrotaxane A with the compound B in the presence of the crosslinking agent C1.

The crosslinked body X-5 is comprised of polyrotaxanes A-1 and A-2, compounds B-1 to B-6, and crosslinking agents C1-1 to C1-3.

The polyrotaxane A-1, in a manner similar to the above one, comprises a linear molecule, cyclic molecules and capping groups, and the cyclic molecules have functional groups 6a to 6c represented by black squares (■) via spacers.

The polyrotaxane A-2, in a manner similar to the above one and in a manner similar to the polyrotaxane A-1, comprises a linear molecule, cyclic molecules and capping groups, and the cyclic molecules have functional groups 16a to 16c represented by black squares (■) via spacers.

The compound B-1 has oxirane groups and the like 21a and 21b represented by black triangles (▲) at both ends thereof, and the oxirane groups and the like are reacted respectively with functional groups 6a and 16a represented by black squares (■), to form bindings.

The crosslinking agents C1-1 to C1-3 have groups represented by black stars (★), 61a and 61b, 62a and 62b, and 63a and 63b, at both ends of each, which can be reacted with and bound to the oxirane groups and the like represented by black triangles (■).

The group 61a represented by a black star (★) of the crosslinking agent C1-1 is reacted with an oxirane group and the like 22b represented by a black triangle (▲) of the compound B-2, to form a binding. The oxirane group and the like 22a represented by a black triangle (▲) of the compound B-2 is reacted with a functional group 6b represented by a black square (■), to form a binding.

The group 61b represented by a black star (★) of the crosslinking agent C1-1 is reacted with the oxirane group and the like 23a represented by a black triangle (▲) of the compound B-3, to form a binding. The oxirane group and the like 23b represented by a black triangle (▲) of the compound B-3 is reacted with the functional group 16b represented by a black square (■), to form a binding. Thereby, the polyrotaxanes A-1 and A-2 are crosslinked via the compound B-2, the crosslinking agent C1-1, and the compound B-3.

Further, functional groups 6c and 16c represented by black squares (■) form a crosslink via the compound B-4, the crosslinking agent C1-2, the compound B-5, the crosslinking agent C1-3, and the compound B-6. Although the numbers of compounds B and crosslinking agents C1 are different from the above, the polyrotaxanes A-1 and A-2 are crosslinked via the compounds B and the crosslinking agents C1, in a manner similar to the above one, from the viewpoint that groups represented by black stars (★) of the crosslinking agent C1 are reacted with the oxirane groups and the like represented by black triangles (▲) of the compounds B.

Thus the polyrotaxanes A-1 and A-2 are bound to each other via the compounds B having oxirane groups and the like and via the crosslinking agents C1, to form a crosslinked body X-5.

The crosslinking composition according to the present application may comprise other component(s) other than the polyrotaxane A, the compound B, and, if any, the crosslinking agent or crosslinking initiator C.

The other components may be, but are not limited to, silica; polystyrene fine particles; calcium carbonate; titanium oxide; clay; mica; dielectric filler such as copper, nickel, silver, carbon black and the like; flame-retardant filler such as magnesium hydroxide, antimony oxide, aluminum hydroxide and the like; dielectric filler such as barium titanate, strontium titanate and the like; antioxidants, UV absorbers, silane coupling agents, plasticizers, and defoaming agents; and the like.

<Crosslinked Body>

The present application discloses a crosslinked body formed from the above-described crosslinking composition.

Specifically, the crosslinked body according to the present invention comprises the above-mentioned crosslinked bodies X-1, X-2, and/or X-3, and/or X-4.

The crosslinked body according to the present application may have higher toughness in comparison with an epoxy resin. Specifically, the crosslinked body according to the present application may have toughness with 25 mm or less, preferably 18 mm or less, more preferably 13 mm or less of a minimum mandrel diameter, when cracks are caused by bending the crosslinked body in a method in accordance with JIS K5600-5-1.

The crosslinked body according to the present invention can be used for a material for which a crosslinked body formed from only a thermosetting resin having oxirane and oxetane groups, for example, an epoxy resin alone, is being applied. In particular, the crosslinked body according to the present invention can solve a problem due to low toughness of a crosslinked body formed from only a thermosetting resin derived from a monomer having oxirane and oxetane groups, for example, a crosslinked body formed from an epoxy resin alone.

Specifically, the crosslinked body according to the present invention can be used for, but not limited in, a sealing material, a package, an underfill, an insulating coating, and a protective coating in electronic and electric components and semiconductors; a coating, an anticorrosion coating, a maintenance coating, a lining material, and an automotive primer for automobiles and electrical appliances; an adhesive; a binder for filler; a printed wiring board material; a civil engineering and construction material; a composite material; and the like.

<Method for Producing Crosslinked Body>

The present application discloses a method for producing the above-described crosslinked body.

The method comprises:
a) a step of preparing the polyrotaxane A;
b) a step of preparing the compound B; and
c) a step of mixing the polyrotaxane A and the compound B, and heating the mixture to crosslink the polyrotaxane A and the compound B, thereby to obtain the crosslinked body.

Further, in a case where the crosslinking agent or crosslinking initiator C is used, the method may further comprise a step of d) preparing the crosslinking agent or crosslinking initiator C, wherein preferably the crosslinking agent or crosslinking initiator C may be mixed together with the polyrotaxane A and the compound B in step c), and the mixture may be heated, to crosslink the polyrotaxane A and the compound B.

Furthermore, the polyrotaxane A, the compound B, and the crosslinking agent or crosslinking initiator C, which are used in the above-described method, have the same definitions as mentioned above.

<<Step a>>

The step a) is a step of preparing a polyrotaxane A.

The step a) may comprise the following steps a)-1), a)-2) and a)-3).

The step a)-1) is a step of preparing a polyrotaxane, wherein the polyrotaxane comprises a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s). The step a)-1) can be carried out in a conventionally known manner. For example, the step a)-1) can be carried out by referring to JP 2005-154675 A1, or JP 2007-91938 A1.

The step a)-2) is a step of preparing a second compound having a functional group source which is at least one selected from the group consisting of a carboxylic acid group, a carboxylate group, a primary amino group, a secondary amino group, a phenol group, an oxirane group, and an oxetane group.

The second compound can be used depending on the functional group to be used. The second compound may be, but is not limited to, a cyclic acid anhydride such as succinic acid anhydride, glutaric acid anhydride, phenylsuccinic acid anhydride, maleic acid anhydride, trimellitic acid anhydride, and the like; chloroacetic acid, 2-bromopropionic acid, 3-bromopropionic acid, 3-chloropropionic acid, and triethyl ammonium salts thereof; pyridinium salts; ethylenediamine, hexamethylenediamine, bromoethylamine; amino acids such as alanine, glycine and the like; 3-methyl-3-oxetanemethanol and the like.

The step a)-3) is a step of reacting the polyrotaxane prepared in the step a)-1 and the second compound prepared in the step a)-2, to obtain a polyrotaxane A.

The step a)-3) can be carried out, depending on kinds of polyrotaxane prepared in the step a)-1), kinds of the second compound prepared in the step a)-2) or the like, at room temperature to 150° C. under normal pressure in the presence or absence of a solvent. The solvent may be, but is not limited to, an ester-based solvent such as ethyl acetate, butyl acetate and the like; a ketone-based solvent such as methyl ethyl ketone, cyclohexanone and the like; dimethyl formamide, dimethylacetamide, dimethyl sulfoxide and the like.

<<Step b>>

The step b) is a step of preparing the compound B.

If the compound B can be commercially purchased, it may be purchased. If not commercially purchased, one can prepare the compound B.

<<Step c>>

The step c) is a step of mixing the polyrotaxane A, the compound B, and if necessary, the crosslinking agent or crosslinking initiator C, and heating the mixture, to crosslink the polyrotaxane A and the compound B.

In the step c), not only the polyrotaxane A and the compound B are crosslinked, but also the compounds B may be crosslinked with each other. Further, the polyrotaxane A and a crosslinked body formed of the compounds B may be crosslinked. In short, by the step c), there are formed the above-mentioned crosslinked bodies X-1, X-2, and/or X-3, and/or X-4.

The step c) can be carried out, depending on kinds of polyrotaxane A to be used, kinds of the compound B to be used, and kinds of the crosslinking agent or crosslinking initiator C to be used, at room temperature to 180° C. under normal pressure in the presence or absence of a solvent. The solvent may be, but is not limited to, an ester-based solvent such as ethyl acetate, butyl acetate and the like; a ketone-based solvent such as methyl ethyl ketone, cyclohexanone and the like; dimethyl formamide, dimethylacetamide, dimethyl sulfoxide, and the like.

The present invention will be illustrated more specifically by way of following Examples, but is not limited thereby.

Example 1

<Preparation of Polyrotaxane>

A polyrotaxane (hereinafter, abbreviating a polyrotaxane as "APR") formed of a linear molecule: polyethylene glycol (average molecular weight: 35,000), a cyclic molecule: α-cyclodextrin (hereinafter, abbreviating α-cyclodextrin just as "α-CD"), and a capping group: an adamantane amine group was prepared in a manner similar to the method described in WO2005/052026. Furthermore, an inclusion amount of APR calculated from $^1$H-NMR analysis (400 MHz JEOL JNM-AL400 (manufactured by JEOL Ltd., Furthermore, $^1$H-NMR analysis was determined by the instrument) was determined as 0.25. In this regard, the inclusion amount, which is defined as an amount at which the cyclic molecules can be included at maximum when the linear molecule has the cyclic molecules included in a skewered manner, and the amount at maximum is normalized to be 1 (see, *Macromolecules* 1993, 26, 5698-5703, whole contents of which are incorporated herein by reference).

The measurement of the molecular weight and the molecular weight distribution of the synthesized polyrotaxane were carried out by using TOSOH HLC-8220 GPC instrument. The measurement was carried out under the conditions: column: TSK guard column Super AW-H and TSKgel Super AWM-H (two columns are linked); elution solution: dimethylsulfoxide (DMSO)/0.01 M LiBr; column oven: 50° C.; flow rate: 0.5 ml/min; sample concentration of about 0.2 wt/vol %; injection amount: 20 μl; pre-treatment: filtration using a 0.2 μm filter; and the standard molecular weight: PEO (it is the same for the following preparation of polyrotaxane). Infrared spectroscopy (IR) was determined by Nicolet 6700 FT-IR. Hydroxyl value and acid value were determined in a manner in accordance with JIS 0070-1992. Gas chromatography (GC) was determined by GC-2014 manufactured by Shimadzu Corporation.

<<Modified Polyrotaxane Y-1>>

A polyrotaxane Y-1 (hereinafter, abbreviating hydroxypropylated polyrotaxane as "HAPR") obtained by hydroxypropylating a part of —OH groups of α-CD of the above-described polyrotaxane was prepared in a manner similar to the method described in WO2005-080469 (whole contents thereof are incorporated herein by reference). $^1$H-NMR analysis determined α-CD inclusion amount: 25%; introduction ratio of hydroxypropyl group: 48%. Further, GPC determined weight-average molecular weight, Mw: 150,000.

<<Modified Polyrotaxane Y-2>>

Into a three-necked flask, 20 g of the modified polyrotaxane Y-1 obtained above was added, and under a slow nitrogen flow, ε-caprolactone (90 g) was added thereto. After stirring the content homogeneously at 130° C. for 60 minutes by a mechanical stirrer, 6 g of tin 2-ethylhexanoate diluted with toluene (50 wt % solution) was added thereto. The mixture was allowed to react for 5 hours, and the solvent was removed, to obtain 113 g of a reaction product (a material obtained by introducing a polycaprolactone group to the modified polyrotaxane Y-1). IR measurement of the reaction product resulted in the observation of a peak derived from an ester at 1736 cm$^{-1}$. Further, GPC determined its weight average molecular weight Mw: 586,800 and its molecular weight distribution Mw/Mn: 1.4. Its hydroxyl value was 73 mg KOH/g. The solvent was removed, to obtain as a solid a polyrotaxane modified on a side chain with polycaprolactone, which is denoted as a modified polyrotaxane Y-2.

<<Modified Polyrotaxane A-1>>

In a reaction vessel, 10 g of the modified polyrotaxane Y-2 was dissolved in 8 g of ethyl acetate. After heating the mixture to 100° C., thereto were slowly introduced 1.0 g of triethylamine and 1.0 g of succinic anhydride (0.8 equivalent relative to a hydroxyl group of the modified polyrotaxane Y-2) dissolved in 4 g of ethyl acetate. After the reaction was continued for 4 hours, it was confirmed by gas chromatography that succinic anhydride had been consumed. The IR spectrum showed a peak derived from a carboxyl group at 1710 cm$^{-1}$, in addition to a peak derived from an ester at 1736 cm$^{-1}$. There was obtained a 50 wt % ethyl acetate solution of a modified polyrotaxane having a carboxylic acid group derived from succinic acid on its α-CD, and this was denoted as a modified polyrotaxane A-1. An acid value thereof was 1.25 mmol/g.

The modified polyrotaxane A-1 obtained had a caprolactone polymeric portion as a spacer between the α-CD and the carboxylic acid group. When it is assumed that the polymeric portion is uniformly provided to hydroxyl groups of the modified polyrotaxane Y-2, the number of repeating units in the polymeric portion was, on average, 3.9.

<<Modified Polyrotaxane A-2>>

In a reaction vessel, 10 g of the modified polyrotaxane Y-2 was dissolved in 20 g of ethyl acetate. After heating the mixture to 100° C., thereto were slowly introduced 0.5 g of triethylamine and 2.0 g of trimellitic anhydride (0.4 equivalent relative to a hydroxyl group of the modified polyrotaxane Y-2) dissolved beforehand in 10 g of ethyl acetate. After the reaction was continued for 4 hours, it was confirmed by gas chromatography that trimellitic anhydride had been consumed. There was obtained a 30 wt % ethyl acetate solution of a modified polyrotaxane having a carboxylic acid group derived from trimellitic acid on its α-CD, and this was denoted as a modified polyrotaxane A-2. An acid value thereof was 1.26 mmol/g.

The modified polyrotaxane A-2 obtained had a caprolactone polymeric portion as a spacer between the α-CD and the carboxylic acid group. When it is assumed that the polymeric portion is uniformly provided to hydroxyl groups of the modified polyrotaxane Y-2, the number of repeating units in the polymeric portion was, on average, 3.9.

<<Modified Polyrotaxane A-3>>

In a reaction vessel, 20 g of a 50 wt % solution of the modified polyrotaxane A-1 in ethyl acetate was diluted with 40 ml of DMSO, thereto were added 5.5 g of benzotriazol-1-yloxy-tris(dimethylamino)phosphonium salt (BOP) and 15 g of ethylenediamine, and the mixture was stirred overnight at room temperature (25° C.). Subsequently, 40 ml of ethyl acetate was added thereto, and after phases were separated by addition of pure water, the organic layer was recovered and its moisture was removed with magnesium sulfate. An IR analysis of the extract showed that the peak at 1710 cm$^{-1}$ derived from a carboxyl group of the modified polyrotaxane A-1, the raw material, decreased, that intensity of a peak at 1735 cm$^{-1}$ increased, and that new peaks appeared at 1250 cm$^{-1}$ and 3400 cm$^{-1}$. Further, the extract was colored purple by a ninhydrin reagent, confirming that the extract was a modified polyrotaxane A-3 having an amino group derived from diethylamine, and this was denoted as the modified polyrotaxane A-3.

The modified polyrotaxane A-3 obtained had a caprolactone polymeric portion and a succinic acid ester portion as spacers between the α-CD and the amino group. When it is assumed that the polymeric portion is uniformly provided to hydroxyl groups of the modified polyrotaxane Y-2, the number of repeating units in the polymeric portion was, on average, 3.9.

<<Modified Polyrotaxane A-4>>

In a reaction vessel, 20 g of a 50 wt % solution of the modified polyrotaxane A-1 in ethyl acetate was diluted with 40 ml of DMSO, thereto were added 1.9 g of 1,8-diazabicyclo[5.4.0]-7-undecene and 2.6 g of 2-bromoethylamine hydrobromide, and the mixture was stirred overnight at room temperature (25° C.). Subsequently, 40 ml of ethyl acetate was added thereto, and after phases were separated by addition of pure water, the organic layer was recovered and its moisture was removed with magnesium sulfate. An IR analysis of the extract showed that the peak at 1710 cm$^{-1}$ derived from a carboxyl group of the modified polyrotaxane A-1, the raw material, decreased, that intensity of a peak at 1735 cm$^{-1}$ increased, and that new peaks appeared at 1250 cm$^{-1}$ and 3400 cm$^{-1}$. Further, the extract was colored purple by a ninhydrin reagent, confirming that the extract was a modified polyrotaxane A-4 having an amine salt derived from 2-bromoethylamine hydrobromide, and this was denoted as the modified polyrotaxane A-4.

The modified polyrotaxane A-4 obtained had a caprolactone polymeric portion and a succinic acid ester portion as spacers between the α-CD and the amino group. When it is assumed that the polymeric portion is uniformly provided to hydroxyl groups of the modified polyrotaxane Y-2, the number of repeating units in the polymeric portion was, on average, 3.9.

<Compound B-1 Having Oxirane Groups>

As a compound B-1 having two oxirane groups, there was used bisphenol A diglycidyl ether (produced by Aldrich) represented by the following formula.

<Compound B-2 Having Oxirane Groups>

As a compound B-2 having two oxirane groups, there was used 3,4-epoxycyclohexylmethyl 3,4-epoxycyclohexanecarboxylate (produced by Aldrich).

<Compound B-3 Having Oxirane Groups>

As a compound B-3 having two oxirane groups, there was used poly(propylene glycol) diglycidyl ether (number average molecular weight Mn=380, produced by Aldrich).

<Preparation of Composition D-1 Using Modified Polyrotaxane A-1>

A 50 wt % solution of the modified polyrotaxane A-1 in ethyl acetate was prepared, and 2.0 g of the solution (solid content of A-1: 1.0 g), 9.0 g of the compound B-1, and 3.0 g of dimethylformamide (DMF) were added to a sample bottle and dissolved uniformly. Subsequently, 90 mg of a tertiary amine C2-1 (2,4,6-tris(dimethylaminomethyl)phenol) was added thereto and dissolved, to obtain a composition D-1 comprising the modified polyrotaxane A-1. Furthermore, in Table 1, amounts of the modified polyrotaxane A-1, the compound B-1, and the tertiary amine C2-1 are respectively described as 10 parts by weight, 90 parts by weight, and 0.90 parts by weight.

<Preparation of Crosslinked Body E-1 from Composition D-1>

<<Measurement Sample S-1>>

The composition D-1 obtained above was cast on a polyethylene (PE) sheet. After preheating at 80° C. for 30 minutes, the cast sheet was subjected to a heat treatment at 120° C. for 4 hours. Furthermore, the amount cast was adjusted so that a thickness of a cured film became about 160 μm. The cured film obtained was peeled off, to obtain a crosslinked body E-1 as a measurement sample S-1.

<<Measurement Sample S-2>>

Further, the crosslinked body E-1 was obtained as a measurement sample S-2 in a manner similar to the above method, except that the amount of the composition D-1 to be cast was adjusted so that the thickness of the cured film became about 400 μm.

<<Measurement Sample S-3>>

The solution of the composition D-1 obtained above was diluted with DMF, to obtain a 50 wt % solution. The solution was applied on a glass substrate through a spin coater. After preheating at 80° C. for 30 minutes, the substrate applied was subjected to a heat treatment at 120° C. for 4 hours, to obtain a crosslinked body E-1 having a film thickness of about 10 μm on the glass substrate. The crosslinked body E-1 was used as a measurement sample S-3 without being peeled off from the glass plate.

<Physical Properties of Crosslinked Body E-1>

The crosslinked body E-1 was measured for the following physical properties. Furthermore, depending on the physical property, the measurement samples S-1 to S-3 were used separately.

<<10% Weight Loss Temperature (Thermal Analysis)>>

The measurement sample S-1 was cut into small pieces and its thermal decomposition behavior was measured by a differential thermal balance, TG/DTA (TG-8120-1C, manufactured by Rigaku Corporation). The temperature when a mass of the sample decreased by 10% is denoted as the decomposition temperature.

<<Young's Modulus, 50% Modulus, Extension Rate, and Breaking Strength>>

The measurement sample S-1 was cut in a size of 30 mm×4 mm and a stress-strain curve thereof was measured by a tensile testing machine (Texture Analyzer Plus XTPL/1, manufactured by Eko Instruments). From a slope of an initial linear portion of the stress-strain curve, a Young's modulus was calculated. An effective length of the sample at the time of measurement was set at 10 mm, and the tensile speed was set at 100 mm/min. Furthermore, a 50% modulus refers to a stress at a strain of 50%. An extension rate is defined in accordance with JIS K6251.

<<Water Absorption Rate>>

Water absorption rates after the following treatments were determined.

1) Water absorption rate 1: the measurement sample S-1 was subjected to a water immersion test (temperature of 20° C.; left immersed for 4 weeks) in accordance with JIS K6258, and the water absorption rate was determined by a weight change rate of the measurement sample S-1 before and after the treatment, that is, by [(mass after immersion−mass before immersion)/(mass before immersion)]×100%.

2) Water absorption rate 2: the measurement sample S-1 was subjected to a hygrothermal aging test treatment (left in an environment of a temperature of 85° C. and a humidity of 85% for 78 hours), and the water absorption rate was determined by a weight change rate of the measurement sample before and after the treatment, that is, by [(mass after treatment−mass before treatment)/(mass before treatment)]×100%.

<<Gel Fraction>>

The measurement sample S-1 was immersed in dimethylformamide (DMF) at room temperature for 24 hours and was thereafter dried. Mass of the measurement sample S-1 was measured before and after the immersion, and a mass loss rate thereof, that is, [(mass after immersion)/(mass before immersion)]×100% was denoted as a gel fraction. Furthermore, the gel fraction is a parameter which shows the degree of crosslinking in the composition. When the gel fraction is 100%, it means that all of the composition has been reacted.

<<Bending Resistance Test>>

Bending resistance was measured by a method in accordance with JIS K5600-5-1.

Using cylindrical mandrels of φ 25 mm, φ 18 mm, φ 15 mm, φ 13 mm, φ 7 mm, φ 5 mm, and φ 4 mm, the measurement sample S-2 was bent by 180° around a mandrel, in a manner such that its cast surface faces outside, in order of a large-diameter mandrel to a smaller-diameter mandrel, and occurrence of cracks was checked when the sample was bent. The minimum diameter of the mandrel with which cracks occurred was denoted as a bending resistance value. This means, therefore, that the smaller the diameter, the better the bending resistance. The measurements were made after the films for bending resistance measurement were subjected independently to the following treatments:

1) treatment A: only the curing when the measurement sample S-2 was prepared;

2) treatment B: in addition to the curing of treatment A, a further heat treatment at 100° C. for 72 hours (a heat aging test in accordance with JIS K6257-1993); and 3) treatment C: in addition to the curing of treatment A, a further treatment at 40° C. and relative humidity of 93% for 4 weeks (a hygrothermal aging test in accordance with JIS K7227-1998).

<<Transmittance Measurement>>

Transmittance of the measurement sample S-3 was measured by a diode-array spectrophotometer (Agilent 8453) using as a reference the same glass substrate as the measurement sample S-3.

Examples 2 to 9

Crosslinked bodies E-2 to E-9 of Examples 2 to 9 were obtained from the compositions described in Table 1, in a manner similar to Example 1. Further, as measurement samples, there were respectively prepared S-1 to S-3, and physical properties thereof were measured in a manner similar to Example 1. The compositions and the physical properties are shown in Table 1.

Comparative Example 1 and Comparative Example 2

Crosslinked bodies CE-1 and CE-2 of Comparative Example 1 and Comparative Example 2 were obtained from the compositions described in Table 1, that is, the compositions in which no modified polyrotaxanes are used. Further, as measurement samples, there were respectively prepared S-1 to S-3, and physical properties thereof were measured in a manner similar to Example 1. The compositions and the physical properties are shown in Table 1. Furthermore, as an acid anhydride 1, there was used 4-methylcyclohexane-1,2-dicarboxylic acid anhydride (MHHPA).

TABLE 1

Compositions and Physical Properties of Crosslinked Bodies of Examples 1 to 9 and Comparative Examples 1 to 2

| Components of composition | Example 1 | Example 2 | Example 3 | Example 4 | Example 5 | Example 6 | Example 7 | Example 8 | Example 9 | Comp. Example 1 | Comp. Example 2 |
|---|---|---|---|---|---|---|---|---|---|---|---|
| A-1 | 10 | 7 | 4 | | | | | | | | |
| A-2 | | | | 20 | 10 | 7 | 4 | | | | |
| A-3 | | | | | | | | 10 | | | |
| A-4 | | | | | | | | | 10 | | |
| B-1 | 90 | 93 | 96 | 80 | 90 | 93 | 96 | 90 | 90 | 100 | 90 |
| Acid anhydride 1 | | | | | | | | | | | 10 |
| C2-1 | 0.90 | 0.93 | 0.96 | 0.80 | 0.90 | 0.93 | 0.96 | 0.90 | 0.90 | 1.0 | 0.90 |

| Physical properties of crosslinked body | Example 1 | Example 2 | Example 3 | Example 4 | Example 5 | Example 6 | Example 7 | Example 8 | Example 9 | Comp. Example 1 | Comp. Example 2 |
|---|---|---|---|---|---|---|---|---|---|---|---|
| 10% Weight loss temp. (° C.) | 328 | | | 367 | 360 | | | | | 329 | 351 |
| Young's modulus (MPa) | 220 | | | 270 | 290 | | | 450 | 640 | 380 | brittle, unmeasurable |
| Bending resistance (treatment A) | <4 mm | 13 mm | 25 mm | <4 mm | <4 mm | 5 mm | 5 mm | <4 mm | <4 mm | 30 mm | 30 mm |
| Bending resistance (treatment B) | <4 mm | | | <4 mm | <4 mm | | | | | 13 mm | |
| Bending resistance (treatment C) | <4 mm | | | <4 mm | 5 mm | | | | | | |
| % Transmittance (550 nm) | 96 | 97 | 97 | 97 | 100 | 100 | 97 | 97 | 98 | 99 | 99 |
| Water absorption rate 1 (%) | 0.6 | | | 0.4 | | | | | | | 2.0 |
| Water absorption rate 2 (%) | 2.0 | | | 1.4 | | | | | | | 2.8 |

Table 1 shows that the crosslinked bodies obtained from compositions each comprising the modified polyrotaxane according to the present invention can provide improved toughness of the material with maintaining optical characteristics and thermal characteristics. Further, Table 1 shows that the crosslinked bodies maintain bending resistance, even after the aging test, that is, even after the treatment B or the treatment C. It is thought that the crosslinked bodies according to the present invention have many movable crosslinking points, and thus that internal strain and volumetric shrinkage at the time of curing are relaxed.

Further, in comparison of the water absorption rates 1 and 2 of Examples 1 and 5 with those of Comparative Example 2, it is clear that the crosslinked bodies of Examples 1 and 5 have better water resistance than the crosslinked body (having a carboxyl group derived from an acid anhydride) of Comparative Example 2, although the crosslinked bodies of Examples 1 and 5 have carboxyl groups derived from the modified polyrotaxanes A-1 and A-2, and the crosslinked body of Comparative Example 2 also has a carboxyl group derived from an acid anhydride. It is thought that incorporation of the modified polyrotaxane according to the present invention forms a denser and more uniform crosslinked structure.

Thus, the crosslinked bodies according to the present Examples and the crosslinked bodies according to the present invention are thought to be materials suitable for electronic and electric members, in particular for a sealing material of a semiconductor, because of excellent toughness, heat resistance, and water resistance of the crosslinked bodies according to the present invention.

Examples 10 to 17

Crosslinked bodies E-10 to E-17 of Examples 10 to 17 are obtained from the compositions described in Table 2 in a manner similar to Example 1. Further, as measurement samples, there were respectively prepared S-1's, physical properties of which were measured in a manner similar to Example 1. The compositions and the physical properties are shown in Table 2. Furthermore, the compositions are such that reactive groups of the modified polyrotaxanes according to the present invention and epoxy groups (of any one of the compounds B-1 to B-3 for Examples 10 to 15, and of both compounds B-1 and B-2 for Examples 17 and 18) are mixed in equivalent amounts.

Comparative Examples 3 to 5

Crosslinked bodies CE-3 to CE-5 of Comparative Example 3 to Comparative Example 5 were obtained according to the compositions described in Table 2, that is, the compositions in which no modified polyrotaxanes were used. As measurement samples, there were respectively prepared S-1's, and physical properties thereof were measured in a manner similar to Example 1. The compositions and the physical properties are shown in Table 2. Furthermore, the compositions of Comparative Examples 3 to 5 are such that the epoxy groups of the compound B-1 and reactive groups of a polycarboxylic acid oligomer, an amine oligomer, or an acid anhydride 1 are mixed in equivalent amounts.

As the polycarboxylic oligomer, there was used a reaction product (acid value: 2.61 mmol/g) of a trifunctional poly(ε-caprolactone) (PLACCEL 308, produced by Daicel Corporation) and succinic acid anhydride. Further, as the amine oligomer, there was used poly(propyleneglycol)bis(2-aminopropyl ether) (number average molecular weight of 2000, produced by Aldrich). The acid anhydride 1 is the same as mentioned above.

TABLE 2

Compositions and Physical Properties of Crosslinked Bodies of Examples 10 to 17 and Comparative Examples 3 to 5

| Components of composition | Example 10 | Example 11 | Example 12 | Example 13 | Example 14 | Example 15 | Example 16 | Example 17 | Comp. Example 3 | Comp. Example 4 | Comp. Example 5 |
|---|---|---|---|---|---|---|---|---|---|---|---|
| A-1 | 83 |  | 86 |  | 71 |  | 85 |  |  |  |  |
| A-2 |  | 72 |  | 78 |  | 58 |  | 75 |  |  |  |
| B-1 | 17 | 28 |  |  |  |  | 7.5 | 12.5 | 68 | 44 | 67 |
| B-2 |  |  | 14 | 22 |  |  | 7.5 | 12.5 |  |  |  |
| B-3 |  |  |  |  | 29 | 42 |  |  |  |  |  |
| Polycarboxylic acid oligomer |  |  |  |  |  |  |  |  | 32 |  |  |
| Acid anhydride 1 |  |  |  |  |  |  |  |  |  |  | 33 |
| Amine oligomer |  |  |  |  |  |  |  |  |  | 56 |  |

| Physical properties of crosslinked body | Example 10 | Example 11 | Example 12 | Example 13 | Example 14 | Example 15 | Example 16 | Example 17 | Comp. Example 3 | Comp. Example 4 | Comp. Example 5 |
|---|---|---|---|---|---|---|---|---|---|---|---|
| Gel fraction (%) | 85 | 99 |  | 94 | 84 | 94 | 84 | 96 | uncured | 79 (swelling) | 95 |
| Young's modulus (MPa) | 1.23 | 6.87 | 0.41 | 5.22 | 0.40 | 2.40 | 0.78 | 4.55 | unmeasurable | no strength, unmeasurable | brittle, unmeasurable |
| 50% Modulus (MPa) | 0.45 | 1.81 | 0.17 | 1.22 | 0.16 | 0.87 | 0.29 | 1.47 | unmeasurable | no strength, unmeasurable | brittle, unmeasurable |
| Extension rate (%) | 180 | 240 | 140 | 160 | 180 | 110 | 160 | 170 | unmeasurable | no strength, unmeasurable | brittle, unmeasurable |
| Breaking strength (MPa) | 1.20 | 7.12 | 0.38 | 3.25 | 0.46 | 1.51 | 0.73 | 3.90 | unmeasurable | no strength, unmeasurable | brittle, unmeasurable |

Table 2 shows that an elastomer having excellent flexibility (low Young's modulus and high extension rate) can be produced by mixing the modified polyrotaxane (A-1 or A-2) of the present invention into the epoxy material (any of the compounds B-1 to B-3) in an equivalent amount. Furthermore, when, for comparison, a curing reaction of the polycarboxylic acid oligomer (a reaction product of a trifunctional poly(ε-caprolactone) and succinic acid anhydride), which is a flexible material, and an epoxy resin was tried (Comparative Example 3), increased viscosity of the composition was confirmed, but curing did not proceed. Even if a flexible amine, poly(propyleneglycol)bis(2-aminopropyl ether) was used, curing was insufficient (the gel fraction was low), and a film having strength could not be obtained (Comparative Example 4). When the acid anhydride 1 was used, only a hard and brittle film could be obtained (Comparative Example 5).

What is claimed is:

1. A crosslinked body formed from a crosslinking composition, which comprises:
   A. a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s), wherein the cyclic molecule(s) has (have) a functional group capable of reacting with an oxirane group and/or an oxetane group, the functional group is one or more selected from the group consisting of a carboxylic acid group, a carboxylate group, a primary amine group, a secondary amine group, a phenol group, an oxirane group, and an oxetane group; and
   B. a compound having two or more oxirane and/or oxetane groups, and
   wherein the functional group is bound to the cyclic molecule via a spacer,
   the spacer comprises a polymeric portion having 1.5 to 10 of an average repeating unit, and
   the weight ratio of (polyrotaxane A)/(compound B) is 0.15 or less,
   the crosslinked body has toughness with 25 mm or less of a minimum mandrel diameter, when cracks are caused by bending the crosslinked body in a method in accordance with JIS K5600-5-1; and
   the crosslinking composition further comprises:
   C. a crosslinking agent or crosslinking initiator.

2. A scaling material comprising the crosslinked body according to claim 1.

3. A coating film comprising the crosslinked body according to claim 1.

4. A method for producing a crosslinked body, comprising the steps of:
   a) preparing a polyrotaxane A comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s), wherein the cyclic molecule(s) has (have) a functional group capable of reacting with an oxirane group and/or an oxetane group, the functional group is one or more selected from the group consisting of a carboxylic acid group, a carboxylate group, a primary amine group, a secondary amine group, a phenol group, an oxirane group, and an oxetane group;
   b) preparing a compound B having two or more oxirane and/or oxetane groups; and
   c) mixing the polyrotaxane A and the compound B, and heating the mixture, to crosslink the polyrotaxane A and the compound B; and
   d) preparing a crosslinking agent or crosslinking initiator C, wherein the crosslinking agent or crosslinking initiator C is mixed together with the polyrotaxane A and the compound B in the step c) and the mixture is heated, to crosslink the polyrotaxane A and the compound B; and e) binding the functional group via a spacer to the cyclic molecule, wherein the spacer comprises a polymeric portion having 1.5 to 10 of an average repeating unit, and wherein the weight ratio of (polyrotaxane A)/(compound B) is 0.15 or less, thereby to obtain the crosslinked body, and wherein the crosslinked body has toughness with 25 mm or less of a minimum mandrel diameter, when cracks are caused by bending the crosslinked body in a method in accordance with JIS K5600-5-1.

5. The method according to claim 4, wherein the crosslinking agent or crosslinking initiator C is:

C1. at least one selected from the group consisting of phenol resins, acid anhydrides, polycarboxylic acid compounds, and primary amine compound; or C2. at least one selected from the group consisting of imidazoles, secondary amines, and tertiary amines.

6. The method according to claim 4, wherein the step a) comprises:

a)-1) a step of preparing a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s);

a)-2) a step of preparing a second compound having a source of the functional group which is one or more selected from the group consisting of a carboxylic acid group, a carboxylate group, a primary amino group, a secondary amino group, a phenol group, an oxirane group, and an oxetane group; and a)-3) a step of reacting the polyrotaxane and the second compound, to obtain the polyrotaxane A having the functional group on the cyclic molecule.

7. The crosslinked body according to claim 1, wherein C. the crosslinking agent or crosslinking initiator is:

C1. at least one selected from the group consisting of phenol resins, acid anhydrides, polycarboxylic acid compounds, and primary amine compounds; or C2. at least one selected from the group consisting of imidazoles, secondary amines, and tertiary amines.

* * * * *

UNITED STATES PATENT AND TRADEMARK OFFICE
CERTIFICATE OF CORRECTION

PATENT NO. : 10,351,741 B2
APPLICATION NO. : 14/896338
DATED : July 16, 2019
INVENTOR(S) : Y. Hayashi It is certified that error appears in the above-identified patent and that said Letters Patent is hereby corrected as shown below:

In the Claims

| Column | Line | ERROR |
|---|---|---|
| 24 (Claim 2, Line 1) | 39 | "scaling" should read --sealing-- |

Signed and Sealed this
Thirty-first Day of March, 2020

Andrei Iancu
*Director of the United States Patent and Trademark Office*